April 26, 1927.
H. R. TRAPHAGEN
ADJUSTING MECHANISM FOR PLOWS
Original Filed Jan. 19, 1920
1,626,368
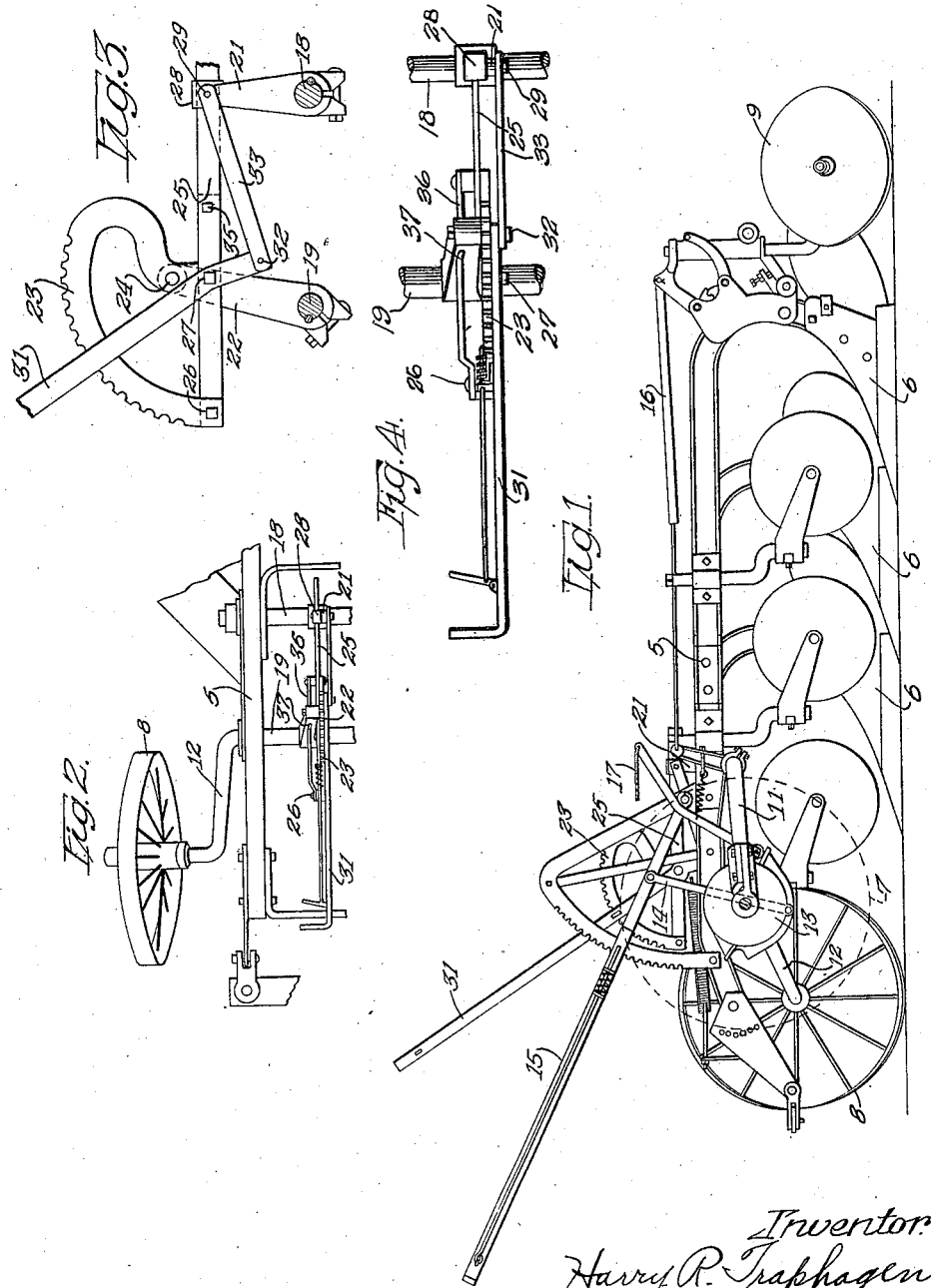
Inventor
Harry R. Traphagen
By Ira J. Wilson
Atty.

Patented Apr. 26, 1927.

1,626,368

UNITED STATES PATENT OFFICE.

HARRY R. TRAPHAGEN, OF ROCKFORD, ILLINOIS, ASSIGNOR TO EMERSON-BRANTINGHAM MANUFACTURING COMPANY, OF ROCKFORD, ILLINOIS, A CORPORATION OF ILLINOIS.

ADJUSTING MECHANISM FOR PLOWS.

Original application filed January 19, 1920, Serial No. 352,287. Divided and this application filed April 24, 1922. Serial No. 556,139.

This invention, a division of my application Serial No. 352,287, filed January 19, 1920, relates to adjusting mechanism employed between the land and furrow wheel crank axles for transmitting motion between them and for adjusting one with respect to the other.

The chief object of the present invention is to provide an improved adjusting mechanism of the character described in which the upstanding adjusting lever shall have a substantially parallel movement when the plow frame is raised and lowered, as by means of a power lift mechanism, and in which the parts will be so relatively associated as to prevent lateral wabbling, which might otherwise be occasioned by reason of the peculiar support of such parts.

Another object is to provide an adjusting mechanism of the character described which will be thoroughly practical for the purposes intended and may be constructed at a comparatively low cost.

Referring to the drawing,—

Figure 1 is a view looking at the land side of a plow embodying my invention;

Fig. 2, an enlarged side view of the adjusting mechanism;

Fig. 3, a fragmentary plan view of the plow showing the adjusting mechanism; and Fig. 4 is an enlarged plan view of said mechanism.

My improvements are especially designed for use in connection with power lift plows embodying a land wheel crank wheel and a furrow wheel crank. The adjusting mechanism which will be presently described and claimed hereinafter, operates between these two cranks. Aside from this adjusting mechanism, the plow may of any suitable or preferred construction.

I have for purpose of illustration shown a plow frame designated generally by 5 carrying plow bodies 6 and supported by a land wheel 7, a furrow wheel 8 and a rear furrow wheel 9. Crank axles 11 and 12 connect the land and furrow wheels, respectively, to the plow frame, each crank axle having a horizontal pivot portion mounted for oscillation on the plow frame. In the present instance, a power lift mechanism operates between the crank axle 11 and the frame for raising and lowering the plow frame at both the front and rear ends, as is well understood in this art. In the instance shown, the driven element of a clutch mechanism 13 concentric with the land wheel 7 is connected by means of a link 14 to an adjusting lever 15 for raising and lowering the forward end of the plow frame. The rear end of the plow frame is similarly raised and lowered by operation of said power lift mechanism through the agency of a connection 16 and a suitable lift mechanism, that shown forming the subject matter of my Patent No. 1,396,793. Said power lift mechanism is controlled by pulling the cord 17 which upon successive actuation, causes the plow to be raised and lowered. During the raising and lowering operations the pivot portion 18 of the crank axle 11 will be oscillated or rocked, and this movement will be transmitted to the horizontal portion 19 of the land wheel crank axle for similarly moving the latter for the purpose of raising or lowering both sides of the plow in unison. The adjusting mechanism for transmitting this movement between the rock shafts or pivot portions 18 and 19 of the crank axles will now be described.

This adjusting mechanism and connection, best shown in Fig. 3, consists of an upright arm 21, fixed to the crank portion 18, an upright arm 22 fixed to the crank portion 19, a notched lever segment 23 pivotally attached at 24 to the upper end of the arm 22, a guide bar 25 bolted at 26 and 27 to both ends of the segment bar and slidable through a guide block 28 pivotally attached at 29 to the upper end of the arm 21, and an adjusting lever 31 pivotally mounted on the bolt 27 on the guide bar 25 and having the usual latch connection with the segment 23 and pivotally connected at its lower end at 32 through the agency of a link 33 with the upper end of the arm 21. The guide bar 25 is of sectional construction having bolted to its furroward side by bolts 26 and 35, a guide bar section 36 which passes through a slot 37 in the arm 22, as plainly shown in Fig. 2. By reason of the foregoing connection, the furrow wheel crank 12 will be rocked by movement of the land wheel crank 11 when the latter is operated either by hand or by power for raising or lowering the plow, the hand lever 31 moving in a substantially parallel movement as distinguished from swinging in an arc, so as not to be a source of danger to anyone close to this lever. The primary purpose of the hand lever 31 is to enable relative adjustment between the crank axles 11 and 12 for the purpose of leveling the plow. Incidentally, the lever 31 is used in conjunction with the lever 13 for regulating the depth of plowing. During said adjustment of the lever 31, its fulcrum is the connection 32. Relative movement between the arms 21 and 22 is permitted in the connection therebetween by reason of the lever arrangement. It will be noted that the guide bar 25 serves by its sliding connection with the arm 21, to maintain the lever segment in level position and by its slidable connection with the arm 22, to maintain this segment and lever in upright position.

It is believed that the foregoing conveys a clear understanding of the objects prefaced above, and while I have illustrated but a single working embodiment, it should be understood that changes might be made in details of construction without departing from the spirit and scope of the invention as expressed in the appended claim.

I claim:

In a plow, in combination, a plow frame, supporting wheels, a forward and a rearward crank axle for said wheels mounted on the frame, an upstanding arm fixed to the pivot portion of each crank axle, a notched segment pivotally attached to the upper end of the forward arm, a horizontal link disposed below the pivotal connection of the segment and its supporting arm, said link being attached at its forward end to said segment and having a sliding connection at its opposite end with the upstanding rear arm, a lever pivoted on said link concentric with said segment and having a latch cooperating with the notched portion thereof, a link pivotally connecting the lever and the rear arm, and means operative between the forward upstanding arm and the link for holding the latter from lateral displacement.

HARRY R. TRAPHAGEN.